United States Patent [19]

Magnant et al.

[11] Patent Number: 5,787,839
[45] Date of Patent: Aug. 4, 1998

[54] MULTIPLE COMPARTMENT TRAVEL FOOD CONTAINER APPARATUS

[76] Inventors: Stephen A. Magnant; Monica L. Magnant, both of 14015 N. 49th St., Suite 2073/9, Scottsdale, Ariz. 85260

[21] Appl. No.: 557,479

[22] Filed: Nov. 14, 1995

Related U.S. Application Data

[63] Continuation-in-part of Ser. No. 278,955, Jul. 22, 1994, abandoned.

[51] Int. Cl.$^6$ ............................................. A01K 5/01
[52] U.S. Cl. .................... 119/51.5; 119/61; 206/545; 206/549; 220/293
[58] Field of Search .................. 119/51.5, 61; 206/541, 206/545, 549; 220/521, 293, 322, 503, 504

[56] References Cited

U.S. PATENT DOCUMENTS

| | | | |
|---|---|---|---|
| 1,046,642 | 12/1912 | Potts | 220/521 |
| 2,101,281 | 12/1937 | Porter | 206/549 |
| 2,555,788 | 6/1951 | Donaldson | 206/549 |
| 2,652,698 | 9/1953 | Schlumbohm | 206/549 |
| 2,879,916 | 3/1959 | Hoffman et al. | 220/322 |
| 3,144,016 | 8/1964 | Basci | 206/549 |
| 4,091,953 | 5/1978 | Daenen | 220/521 |
| 4,474,303 | 10/1984 | Maccise | 206/545 |
| 4,648,512 | 3/1987 | Tarozzi et al. | 206/541 |
| 4,716,855 | 1/1988 | Andersson et al. | 119/61 |
| 4,978,023 | 12/1990 | Behlmann et al. | 206/545 |
| 5,423,426 | 6/1995 | Harper | 206/549 |
| 5,501,338 | 3/1996 | Preston | 206/549 |

FOREIGN PATENT DOCUMENTS

| | | | |
|---|---|---|---|
| 6804219 | 9/1969 | Netherlands | 220/521 |

*Primary Examiner*—Todd E. Manahan
*Attorney, Agent, or Firm*—Gregory J. Nelson

[57] ABSTRACT

A multiple compartment container designed to contain and carry pet food and water when on trips or traveling. The lower compartment of the container is an insulated unit designed to contain a supply of water. The upper compartment of the container comprises a dish compartment designed to hold food which may be closed by a sealing cover. The dish compartment sits on the lower compartment and forms a closure for the lower compartment. The upper compartment is removable from the lower compartment so the lower and upper compartments may be separately used for feeding or watering an animal as required. The container has a pivotal handle that provides ease of transport and locks the upper compartment in place for carrying. The handle may be pivoted to the container to selectively lock or unlock the compartments. A cover for the upper compartment is rotatable between an open and a closed position which seals the contents in the dish of the upper compartment.

11 Claims, 3 Drawing Sheets

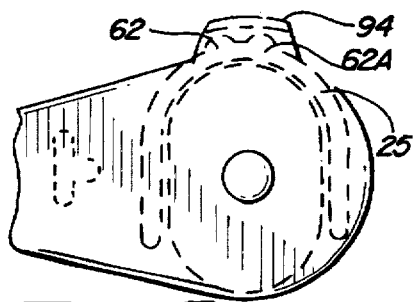
FIG.6
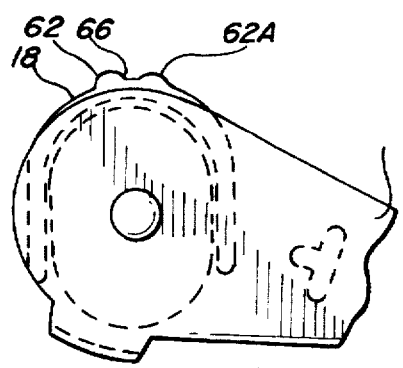
FIG.6A FIG.4
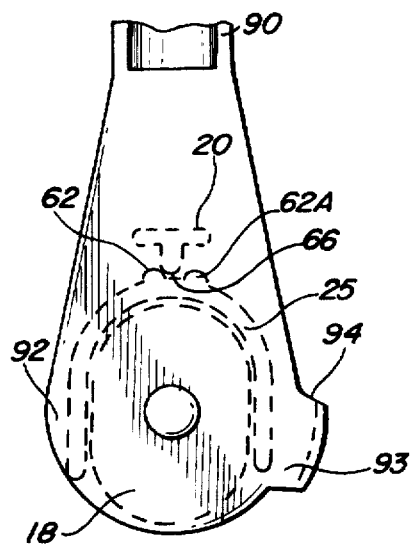
FIG.6B
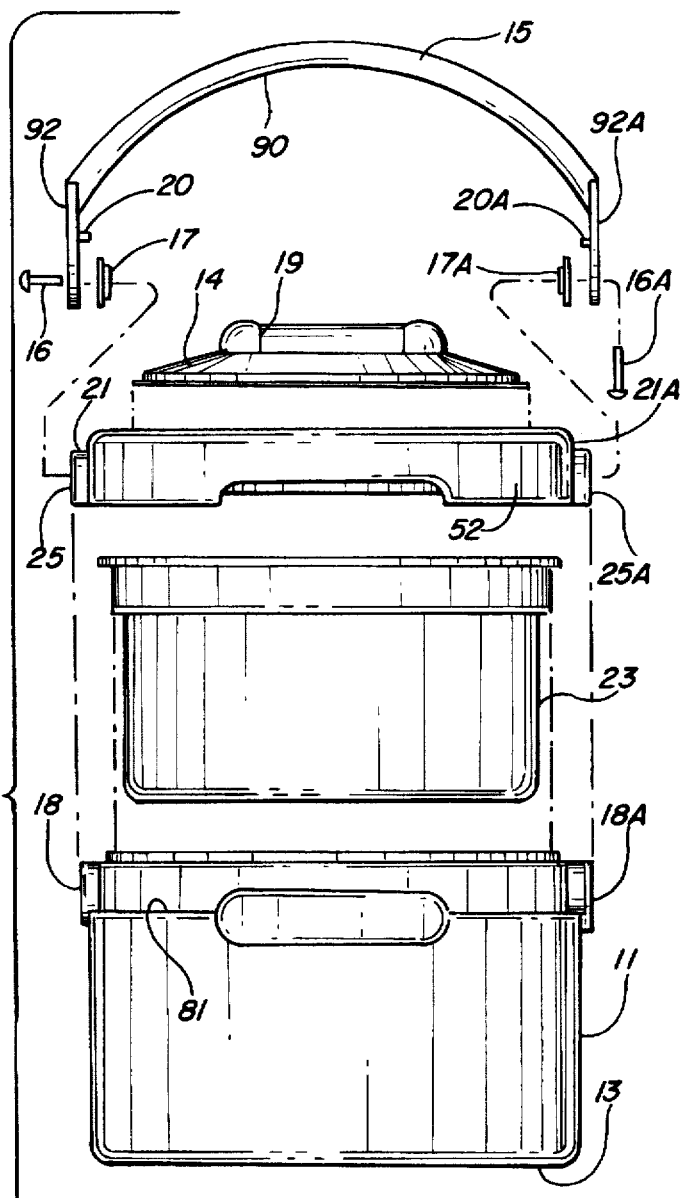
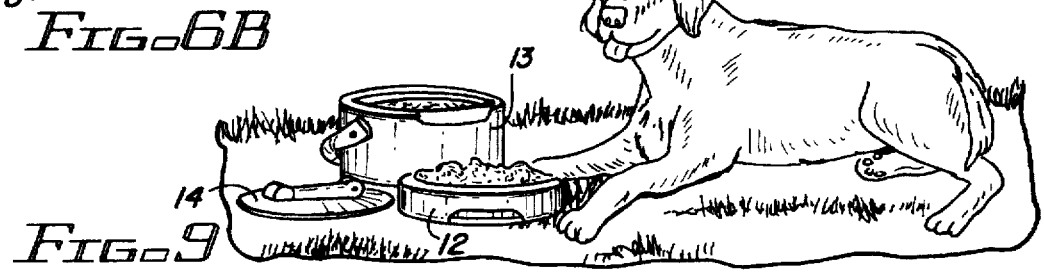
FIG.9

MULTIPLE COMPARTMENT TRAVEL FOOD CONTAINER APPARATUS

CROSS REFERENCE TO RELATED APPLICATION

This application is a Continuation-in-Part of Ser. No. 08/278.955, filed Jul. 22, 1994, now abandoned entitled: Multiple Compartment Travel Food Container Apparatus.

BACKGROUND OF THE INVENTION

FIELD OF THE INVENTION

The present invention relates to pet devices, and in particular, to pet devices that are designed as convenient multiple compartment carry-all food and water containers to be used by owners and trainers on day trips in order to provide a supply of food and drinking water for animals.

It is common for pet owners and trainers to use containers such as bowls for food and separate bottles for water which containers are carried when taking animals on trips. Also, available are insulated containers and coolers for use by individuals on trips. Examples of such devices are shown in U.S. Pat. No. 3,070,253, issued to R. P. Brown, on 25 Dec. 1962 for an "Insulated Container", and U.S. Pat. No. 4,399,926 issued to Samuel Eidels-Dubovoy for a "Resealable Easy Opening Container". These patents show containers that are insulated and are easy to open and provide a portable system for carrying food or drink and at the same time, providing insulation of the material carried. However, there nevertheless exists a need for a compact, portable unit which will allow the user to store required nourishment for pets in a multiple compartment container which has separate chambers for food and water. There is also a need for an apparatus which provides separate serving dishes in a single compact container which will insulate contained foods or fluids to keep them at a desired temperature.

SUMMARY OF THE INVENTION

Briefly, it is an object of this invention to provide a convenient multiple compartment pet food and water container for use by individuals with pets when on day trips and the like. The container has two generally round compartments, one for receiving food and the other for receiving fluids. The first compartment defines an upper chamber or dish for storing and dispensing food which has a closure which is rotated between a closed and an open position. The second compartment defines a lower chamber for receiving and supplying fluids. When the compartments are assembled as a unit, the upper chamber seats on the upper edge of the lower chamber to seal the contents of the lower chamber. The lower chamber has a handle attached to the opposite sides of said lower chamber to facilitate easy carrying of the entire apparatus. The handle also serves to selectively lock the compartments together for storage and transportation or unlock the compartments for use.

BRIEF DESCRIPTION OF THE DRAWINGS

Further objects and features of the present invention will become apparent by reference to the following description taken in conjunction with the following figures, in which:

FIG. 4 is an exploded frontal elevational view thereof; and

FIGS. 6, 6A and 6B are details of the handle locking structure showing the locked and unlocked position;

FIG. 9 shows the compartments separated for use; and

DESCRIPTION OF THE PREFERRED EMBODIMENT

Figure 1:
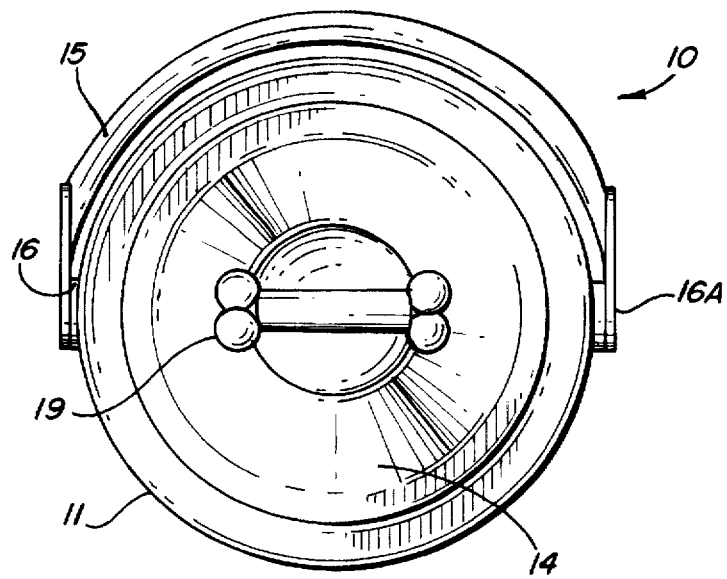
FIG. 1 is a top plan view of the novel multiple compartment travel food container apparatus.
Figure 2:
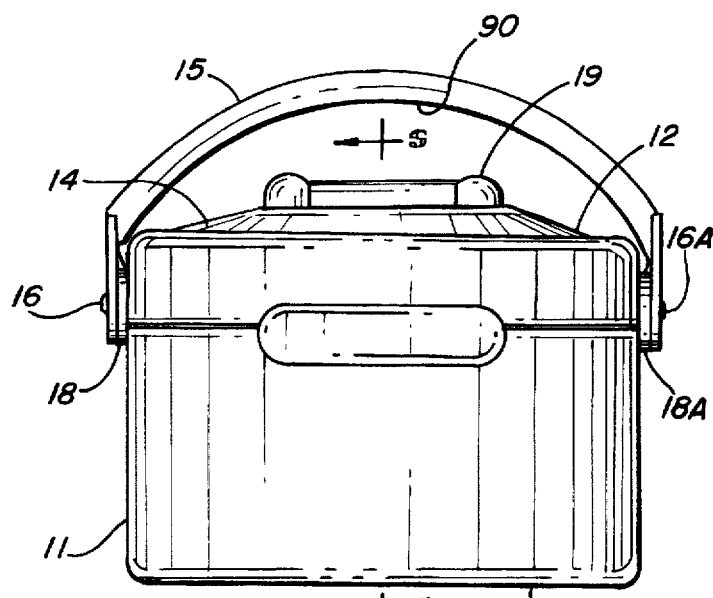
FIG. 2 is a frontal elevational view thereof.
Figure 3:
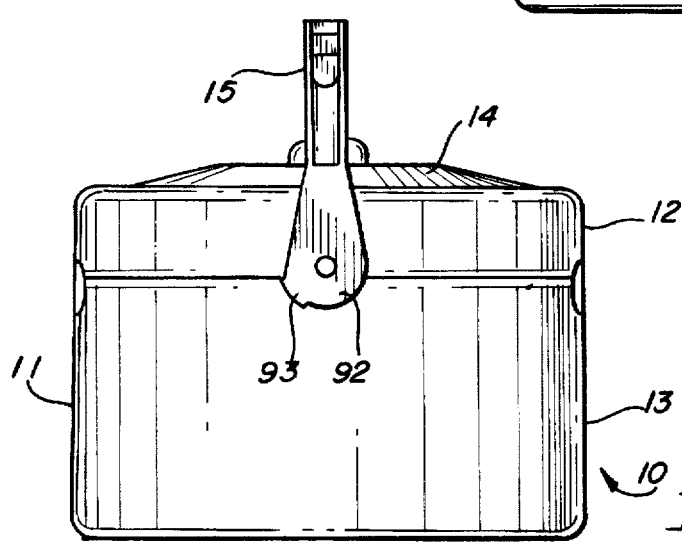
FIG. 3 is a side elevational view thereof.

As seen in the drawing figures, the novel multiple compartment travel pet food container 10 includes an upper compartment 12 and a lower compartment 13. The upper compartment 12 is formed from a suitable material such as plastic by injection molding. A circular dish 54 is formed in the upper compartment and has an outer sidewall 52 with an annular edge 55. An inner rim 53 depends from the bottom 58 spaced from the sidewall 52. The dish 54 has a generally curved interior bottom 58 for ease of feeding to provide the animal easy access to the food and also to accommodate easy cleaning. A circumferential recess 56 extends around the upper edge 55 of the dish and is diametrically intercepted on opposite sides by inwardly extending tabs 57. A pair of generally U-shaped recesses are oppositely formed in sidewall 52 and are each defined by generally U-shaped flanges 25, 25A. The upper surface of each of the flanges 25, 25A is provided with two spaced-apart, upwardly extending detent projections 62 and 62A which define a recess or land area 66 between them, as seen in FIG. 6B.

Figure 10:
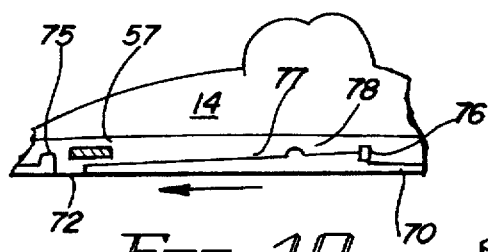
FIG. 10 is a sectional view taken along line 10—10 of FIG. 9.

A circular cover 14 is designed to tightly seal the upper compartment. The cover has a convenient control handle 19 which is shown as having the shape of a bone or other decorative shape which allows the user to easily turn the cover 14. As seen in FIG. 10, the cover is provided with a peripherally extending flange 70 which is intercepted by a pair of recesses 72 which are diametrically opposed. A stop 75 projects upwardly at one side of the recess. The section of flange 70 extending from the side of the recess opposite stop 75 inclines upwardly along a ramp section 77 to a second stop 76. A similar stop is provided in association with the flange 70 at the diametrically opposed recess. A ramp or incline is provided along the flange between the diametrically opposed recess and stop, similar to that seen in FIG. 10. It should be noted that the stops 76 are generally aligned with the axial orientation of the control handle 19.

The cover 14 serves to seal the dish of the upper compartment to maintain the contents secure and fresh which is important particularly with moist pet food. Referring to FIGS. 7, 8A, 8B and 10 it will be seen that when the cover 14 is positioned over the dish 54 with the recesses 72 aligned with the tabs 57, the cover will seat on the annular edge 55 of the upper compartment. The cover may then be closed by rotating the cover by means of the handle 19 in a clockwise direction. Note the handle may not be turned counter-clockwise due to the stops 75. As the cover is manually rotated, the cover will be forced downwardly by the ramps 77 acting against the tabs 57. When the cover reaches a closed position shown in FIG. 8A, the tabs 57 pass over detents 78 and then engage the associated opposite stops 76.

In this position, the dish in the upper compartment is sealingly closed by the cover and contents such as wet or dry pet food will be maintained fresh and may not be accessed by the animal until opened by the pet attendant. This allows the user to remove the upper compartment without opening the upper compartment.

The lower compartment 13 is shown as being generally circular having an outer shell which has a side wall 11 and a bottom wall 13. The upper edge of the side wall 11 defines a peripherally extending recess 81 which snugly engages the interior of the outer sidewall 52 of the upper compartment. Oppositely formed bosses 18 and 18A are provided in the area of the rim and are adapted to be engaged by the opposite U-shaped flanges 25, 25A in the edge 52 of the upper compartment. The bosses and recesses engage to properly align the upper compartment with respect to the lower compartment and prevent relative movement therebetween.

The lower compartment includes a liner 23 which defines a dish 89 for food, water or other fluids. The liner defines a peripheral shoulder 85 spaced below the upper edge of liner 23. The lower compartment can be fabricated with the outer shell and the liner as an integral unit or preferably is formed as separate sections with suitable insulation 88 interposed between the side wall and bottom of the exterior and the liner. The inner liner 23 is permanently affixed to the shell during the fabrication process.

Figure 5:
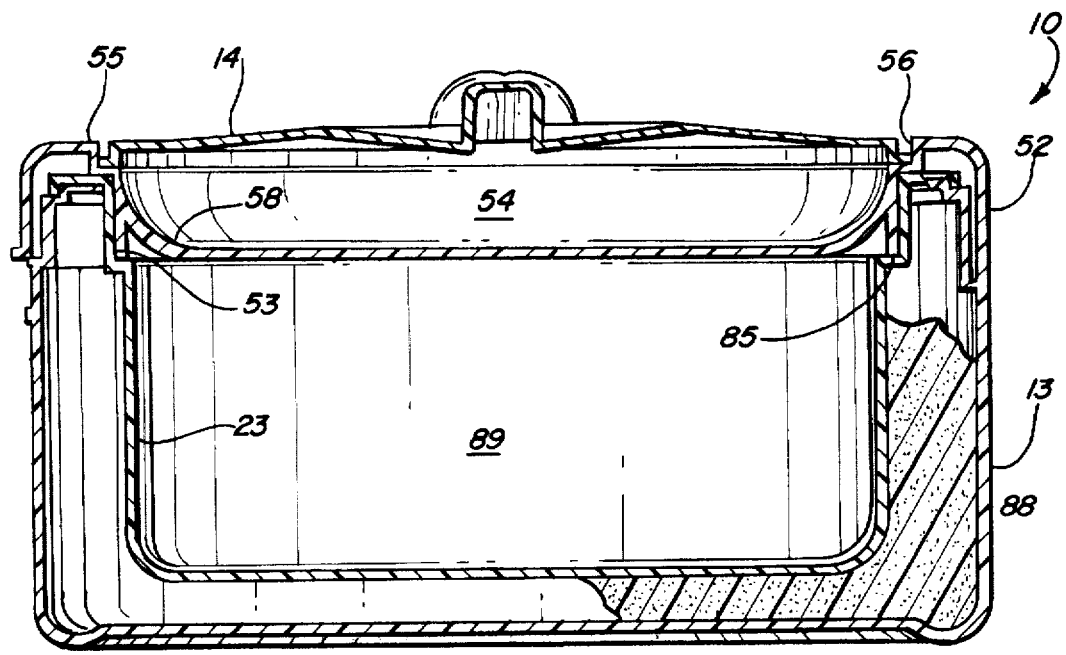
FIG. 5 is a cross-sectional view of the novel apparatus taken along line 5—5 of FIG. 2.
Figure 8:
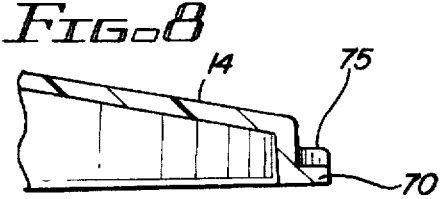
FIG. 8 is a detail cross-sectional view of the edge of the cover.
Figure 8A:
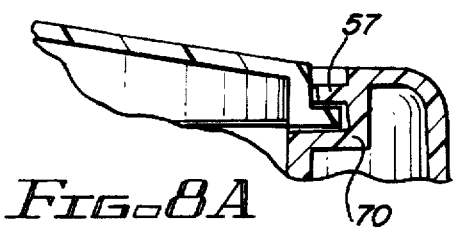
FIG. 8A is a cross-sectional view taken along line 8A—8A of FIG. 7 showing the cover in a locked position.
Figure 7:
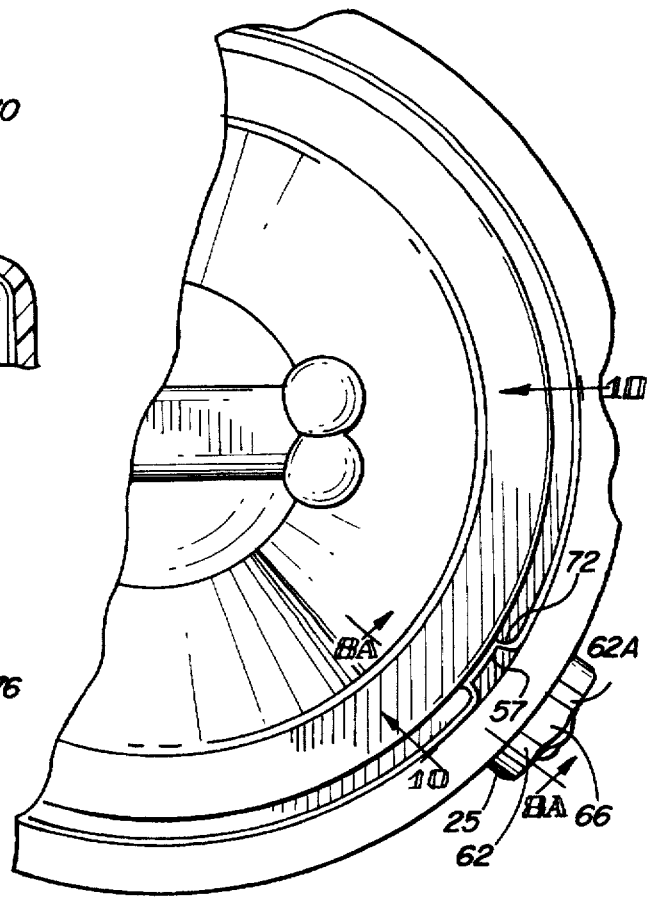
FIG. 7 is a partial top view of the cover for the upper chamber.

It will be seen that the dish 89 within the lower compartment may be enclosed by the mating of the upper compartment when the upper compartment is seated within the receiving area at the upper peripheral edge of the lower compartment. The outer sidewall 52 engages the upper edge of wall 11 and inner rim 53 seats on shoulder 85 as best seen in FIG. 5.

A generally semicircular handle 15 is pivotally connected to bosses 18, 18A at the opposite sides of the lower compartment by means of rivet rods 16 and 16A and rivet retainer plates 17 and 17A. Referring to FIGS. 6 to 6B, it will be seen that the handle has an arcuate portion 90 which pivots at opposite ends 92 and 92A. Each of the opposite ends 92 and 92A have an projection 93 with an upwardly depending arcuate flange 94. When the handle is in the position shown in FIG. 6, it will be seen that the flange 94 will engage or be in close proximity with the upper edge of the detents 62, 62A on the flanges 25, 25A on the upper compartment edge. In this position the upper and lower compartments are secured as a unitary structure for compact storage. In cramped quarters, space can be maximized by pivoting the handle 15 completely to the side of the apparatus to a position slightly below a horizontal plane which will maintain the two compartments in a locked position as shown in FIG. 6. This is due to the flange 94 engaging or being in close proximity to the top of detents 62 and 62A on the flanges of the upper chamber 12.

When the handle 15 is moved to the vertical position shown in FIG. 6B, the apparatus is in the carrying position. In this position, the ribs 20 on the inner surface of ends 92, 92A will be engaged in the land area 66 between the detents 62, 62A securing the upper and lower compartments together. The detents 62, 62A provide the user tactile "feel" as the handle is rotated in either direction.

When the handle is rotated to the position shown in FIG. 6A, the upper compartment is unlocked and may be removed from the lower compartment.

When the user prepares for a trip, the user will fill the lower compartment with a cool fluid such as water and fill the upper chamber with food. The cover is placed on the upper compartment and rotated to locking position. As explained above, the ramps 77 formed on the flange 70 of the cover force the cover into sealing engagement with the peripheral rim of the upper compartment when the cover is rotated. With the upper compartment positioned or seated on the lower compartment, the handle 15 can be rotated from the side of the housing to the upright position locking the compartments together and permitting the user to carry both compartments easily in one hand as a single unit. When the animal requires food or water, the handle 15 will be rotated to the open position shown in FIG. 6A positioned at the side of the housing and the upper compartment with the cover in place may be separated from the lower compartment. Access to the lower compartment is provided so the animal may be watered without exposing the food in the upper compartment to the animal. If the pet attendant wishes to feed the animal, the upper compartment can be placed on a supporting surface and the cover removed and both compartments used as seen in FIG. 9. It is noted that the sidewall 52 of the compartment provides stable support for the upper compartment. To remove the cover, the cover is rotated to the unlocked position in which the opposite tabs 57 align with the recesses 72 in the cover allowing the cover then to be vertically lifted or removed from the upper compartment exposing the interior dish which contains the food.

Similarly, the upper compartment may be used without removing it from the lower compartment. To do this, the handle 15 is rotated to a side position as is shown in FIGS. 6 or 6A, which provides access to the upper compartment. Note that in the locked position, the handle which is in the shape of a bone, aligns with the opposite lower ends of the handle. When the apparatus is assembled as a unitary container the U-shaped recesses in the edge of the cover provide alignment properly increasing the upper compartment with regard to the lower compartment.

It will be apparent from the foregoing, the present invention is a unique pet carry-all or pet galley which provides an attractive food and water container that may be taken on trips with pets. The device will keep food dry and water cool. The owner is not required to carry extra dishes or water bottles as the device has built in compartments for clean, hassle-free feeding of pets. The unique design allows the water and food compartments to be carried together as a unit and conveniently facilitates separation at the time of use. The cover arrangement on the upper food compartment maintains food in a safe condition and food such as moist food will remain moist and is sealed so it will not leak from the upper compartment. The engagement of the outer sidewall 52 and inner rim 52 at opposite sides of the lower compartment seal the contents of the lower compartment to prevent spillage.

When not in use, the cover 14 may also be placed in an inverted position resting on the rim of the upper compartment. In this position, multiple units may be stacked for retail display or compactness for shipping.

While we have described our invention in connection with specific embodiments thereof, it is clearly to be understood that this is set forth by way of example, not by way of limitation, as the scope of our invention will become apparent to those skilled in the art to make various changes, alterations and modifications to the invention described herein. To the extent these alterations changes and the modifications do not depart from the spirit and scope of the appended claims they are intended to be encompassed therein.

We claim:

1. A portable pet food and water container comprising:

(a) an upper compartment having a generally circular outer sidewall;

(b) the upper compartment defining a first chamber for reception of food, said upper compartment having an upper edge extending around said first chamber;

(c) a cover engageable with said upper edge and being rotatable with respect to said upper edge between a sealed and open position, said cover having peripheral sealing means engageable with said upper edge which when said cover is rotated to said sealed position applies a force to said cover placing it in sealed engagement with said upper compartment edge;

(d) a lower compartment having a generally circular sidewall, a bottom and top edge and defining a second chamber for reception of water, said top edge being configured to receive the outer sidewall of said upper compartment to form a container comprised of the two compartments; and (e) rigid handle means pivotally attached to said lower compartment and pivotal between a first generally horizontal locked position, a second generally horizontal unlocked position and a generally vertical locked position, said handle means having locking means engageable with said upper compartment for securing said compartments, when in said first generally horizontal and said generally vertical positions whereby in said second generally horizontal position of said handle means said upper and lower compartments may be selectively separated for independent use or whereby said compartments may be secured together as a unit with the handle means either said generally horizontal first position or said vertical position.

2. The container according to claim 1 wherein said upper and lower compartments include insulation material to maintain the contents of said compartments at a desired temperature.

3. The container of claim 1 wherein said handle means is generally semi-circular and is pivotally attached to said lower compartment sidewall at diametrically opposite bosses.

4. The container of the claim 3 wherein said cover has a circular edge and defines a recess in said circular edge and said upper compartment edge projecting flanges registerable with said recess.

5. The container of claim 3 wherein said bosses define detent means and wherein said ends of said handle carry locking means positionable with respect to said detent means to lock said upper and lower compartment together when the handle is in a generally vertical locked position.

6. The container of claim 5 wherein said handle is pivotal from said vertical position in one rotational direction to a generally horizontal position which unlocks the upper compartment from the lower compartment and wherein said handle is rotatable in the opposite rotational direction from said vertical position to a position in which said upper and lower compartments are in a locked position.

7. The container of claim 1 wherein said cover includes a handle generally oriented toward said recesses when said cover is in an unlocked position.

8. The container of claim 7 wherein said handle has the general configuration of a bone.

9. The container of claim 1 wherein said cover has a generally circular edge defining ramp means and said upper edge has projection means cooperable with said ramp means to force said cover into sealing engagement with said compartment when said cover is rotated in a predetermined rotational direction to said sealed position.

10. The container of claim 9 wherein said upper compartment has an inner sidewall and wherein said top edge of said lower compartment defines a shoulder which sealingly engages said inner sidewall when said compartments are secured together.

11. The container of claim 1 wherein said compartments are molded plastic.

* * * * *